US010487768B2

(12) United States Patent
Merlino et al.

(10) Patent No.: US 10,487,768 B2
(45) Date of Patent: Nov. 26, 2019

(54) METHOD AND SYSTEM FOR CONTROLLING INJECTIONS BY FUEL INJECTORS

(71) Applicant: GM GLOBAL TECHNOLOGY OPERATIONS LLC, Detroit, MI (US)

(72) Inventors: Gennaro Merlino, Piemonte (IT); Angelo Cancellieri, Turin (IT); Umberto Ferrara, Turin (IT); Francesco Concetto Pesce, Turin (IT); Alessandro Forina, Piemonte (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 241 days.

(21) Appl. No.: 15/597,741

(22) Filed: May 17, 2017

(65) Prior Publication Data
US 2018/0334983 A1    Nov. 22, 2018

(51) Int. Cl.
  *F02D 41/30* (2006.01)
  *F02D 41/38* (2006.01)
  *F02D 41/40* (2006.01)
  *F02D 41/04* (2006.01)

(52) U.S. Cl.
  CPC ......... *F02D 41/3827* (2013.01); *F02D 41/04* (2013.01); *F02D 41/403* (2013.01); *F02D 41/405* (2013.01); *F02D 2041/389* (2013.01); *F02D 2200/06* (2013.01)

(58) Field of Classification Search
CPC .... F02D 41/3827; F02D 41/40; F02D 41/402; F02D 41/403; F02D 41/405; F02D 41/401; F02D 41/04; F02D 41/247; F02D 41/406; F02D 2041/389; F02D 2200/06; F02D 2200/0616
USPC .......................................... 123/299, 304, 445
See application file for complete search history.

(56) References Cited

U.S. PATENT DOCUMENTS

| | | | |
|---|---|---|---|
| 8,725,388 B2* | 5/2014 | Guglielmone | ........ F02D 41/401 123/299 |
| 2016/0090936 A1* | 3/2016 | Melis | .................. F02D 41/2467 701/105 |

FOREIGN PATENT DOCUMENTS

GB    2498355 A * 7/2013 ........... F02D 41/402

* cited by examiner

*Primary Examiner* — Mahmoud Gimie
(74) *Attorney, Agent, or Firm* — Lorenz & Kopf, LLP

(57) ABSTRACT

Methods and systems are provided for controlling fuel injections by a fuel injector in a cylinder of an internal combustion engine. First and second fuel injections are applied in each cycle of a piston in the cylinder. First and second electronic control signals are applied to the fuel injector to generate first and second fuel injections by the fuel injector during a first cycle of the piston. A hydraulic fusion state of the generated first and second fuel injections is determined. A parameter of the applied first and second electronic control signals is adjusted in response to determining the hydraulic fusion state and applied to the fuel injector to generate first and second fuel injections by the fuel injector during a second cycle of the piston subsequent to the first cycle.

18 Claims, 5 Drawing Sheets

METHOD AND SYSTEM FOR CONTROLLING INJECTIONS BY FUEL INJECTORS

TECHNICAL FIELD

The present disclosure generally relates to methods and systems for controlling injections by fuel injectors of an internal combustion engine in a motor vehicle, and more particularly to controlling an electric dwell time between control signals applied to the injectors.

BACKGROUND

This section provides background information related to the present disclosure which is not necessarily prior art.

It is known that a conventional fuel injection system for a combustion engine includes a fuel rail and a plurality of electrically controlled fuel injectors, which are hydraulically connected with the fuel rail by respective feeding conduits.

Each fuel injector generally includes a fuel inlet, a fuel outlet and a movable needle, which repeatedly opens and closes the fuel outlet. When the needle is in an open position, fuel is injected under pressure into a cylinder of the engine. The movable needle is actuated with the aid of a dedicated actuator, typically a solenoid actuator or a piezoelectric actuator, which is driven by an electric circuit controlled by an engine control system (ECS). The ECS operates each injection pulse by generating control signals acting upon a control valve and causing the needle to open the fuel injector.

In order to improve the characteristics of exhaust emissions and reduce combustion noise in engines, particularly in Diesel engines having a common-rail fuel injection system, so-called multiple fuel injection patterns are adopted. In a multi-injection pattern, the fuel quantity to be injected in each cylinder at each engine cycle is divided into a plurality of injections. More specifically, in a multi-injection pattern, for each engine cycle, a series or train of injections is performed by each injector, typically starting from a pilot injection and following with a main injection, which gives all or most of the torque in an engine cycle, eventually terminating with post injections.

The number of injections in the train of injections and their timing is dependent on the combustion mode and is determined by the ECS. A pilot injection before a main injection strategy is able to give benefits in terms of brake specific fuel consumption (BSFC) and/or combustion noise (CN) and/or soot emissions, depending on the calibration used. In particular, a pilot injection before a main injection is an enabler for a better fuel spray atomization and therefore increases combustion efficiency.

Zero hydraulic interval (ZHI) between a pilot injection and a main injection, namely a condition in which there is no interval between the hydraulic closing of the needle of the injection after a pilot injection and the hydraulic opening of the needle for a main injection has previously been targeted. However, ZHI is a critical and difficult condition to reach and maintain because the electrical dwell time (DT) range for controlling the ZHI is very narrow and therefore it is difficult to maintain it along engine life due to disturbances such as injectors aging drift.

Future engine, particularly diesel engine, legislations will require more stringent targets for emissions and fuel consumption. As discussed above, multi-injection patterns allow an optimal trade-off between NOx and soot emissions at a certain combustion efficiency. Strategies have been investigated with very close injection pulses in order to further improve combustion noise and fuel efficiency whilst avoiding increased NOx emissions.

Injector ageing can be problematic when very close injection patterns are used. Very small hydraulic dwell time strategies are sensitive to pressure wave propagation phenomena and needle/servo-valve dynamics that could affect significantly the hydraulic injection rate, injection stability and injection deviation behavior over the life of the injector.

Accordingly, it is desirable to provide methods and systems that are able to control the injectors in a way that reduces or eliminates at least some of the negative effects of injector ageing. In addition, it is desirable to reduce or avoid changes in hydraulic injection rates caused by injector ageing and very close injection multiple injection strategies. Furthermore, other desirable features and characteristics of the present invention will become apparent from the subsequent detailed description and the appended claims, taken in conjunction with the accompanying drawings and the foregoing technical field and background.

SUMMARY

An electronic control system is provided for controlling fuel injectors in an internal combustion engine. In one embodiment, the electronic control system is configured to apply at least first and second electronic control signals to a fuel injector to generate first and second fuel injections during each cycle of a piston in a cylinder of the internal combustion engine. The electronic control system includes a fusion determination module configured to determine hydraulic fusion of the first and second fuel injections during a first cycle of the piston. A control signal adjustment module of the electronic control system is configured to adjust at least one parameter of the first and second electronic control signals in response to the fusion determination module determining hydraulic fusion. The adjusted parameter of the first and second electronic control signals is configured for application to the fuel injector during a subsequent cycle of the piston to separate the first and second fuel injections.

A method is provided for controlling fuel injections by a fuel injector in a cylinder of an internal combustion engine. In one embodiment, at least first and second fuel injections are applied in each cycle of a piston in the cylinder. At least first and second electronic control signals are applied to the fuel injector to generate first and second fuel injections by the fuel injector during a first cycle of the piston. Hydraulic fusion of the generated first and second fuel injections is determined. At least one parameter of the applied first and second electronic control signals is adjusted in response to determining hydraulic fusion. At least first and second control signals having the adjusted parameter are applied to the fuel injector to separate the first and second fuel injections during a subsequent cycle of the piston.

A vehicle is provided including an internal combustion engine. The internal combustion engine includes cylinders, pistons and a respective fuel injector for each cylinder. In one embodiment, an electronic control system is configured to apply at least first and second electronic control signals to each fuel injector for generating first and second fuel injections during each cycle of each piston in respective cylinders. For each injector, a fusion determination module is configured to determine hydraulic fusion of the first and second fuel injections during a first cycle of the respective piston. A control signal adjustment module adjusts at least one parameter of the first and second electronic control signals in response to the fusion determination module determining hydraulic fusion. The adjusted parameter of the first and second electronic control signals is configured for application to the respective fuel injector during a subsequent cycle of the respective piston to separate the first and second fuel injections.

DESCRIPTION OF THE DRAWINGS

The exemplary embodiments will hereinafter be described in conjunction with the following drawing figures, wherein like numerals denote like elements.

DETAILED DESCRIPTION

The following detailed description is merely exemplary in nature and is not intended to limit the invention disclosed herein or the application and uses of the invention disclosed herein. Furthermore, there is no intention to be bound by any principle or theory, whether expressed or implied, presented in the preceding technical field, background, summary or the following detailed description, unless explicitly recited as claimed subject matter.

Figure 1:
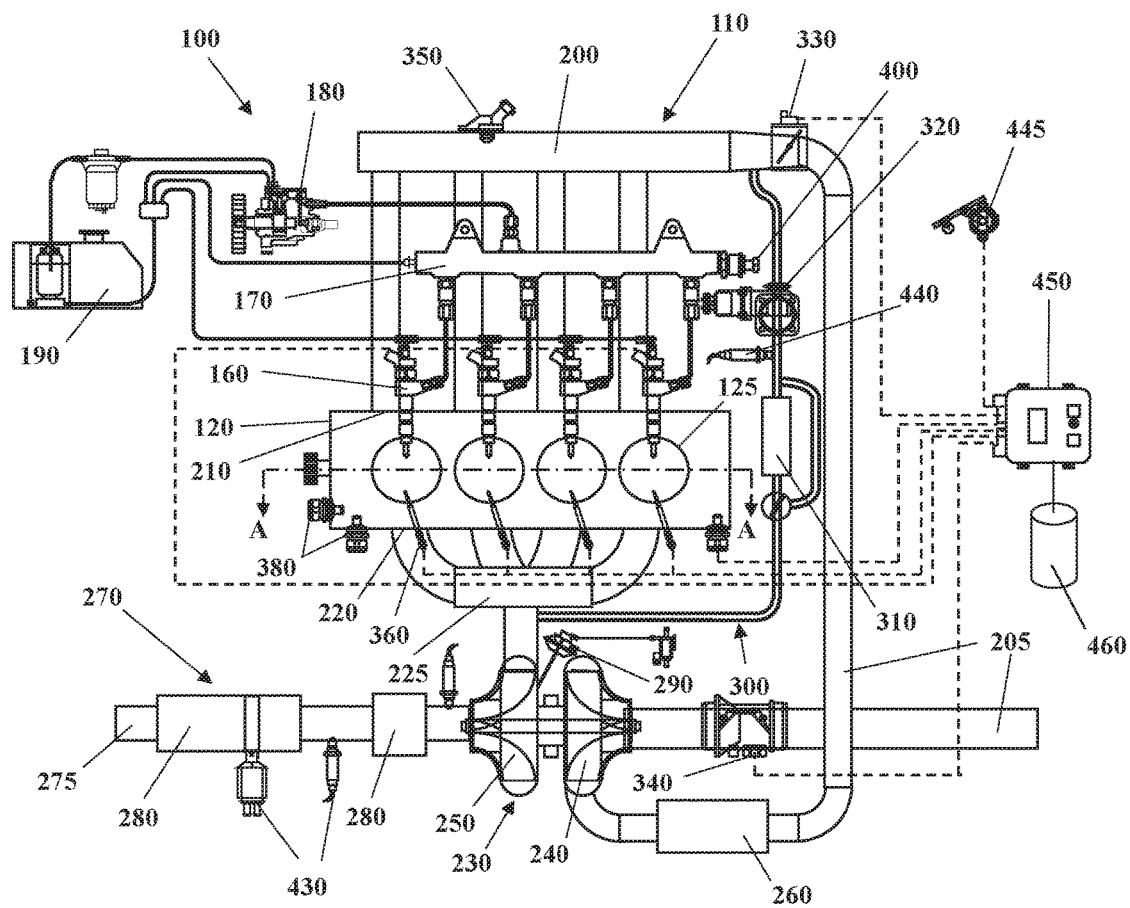
FIG. 1 schematically shows an automotive system according to an embodiment of the present disclosure.
Figure 2:
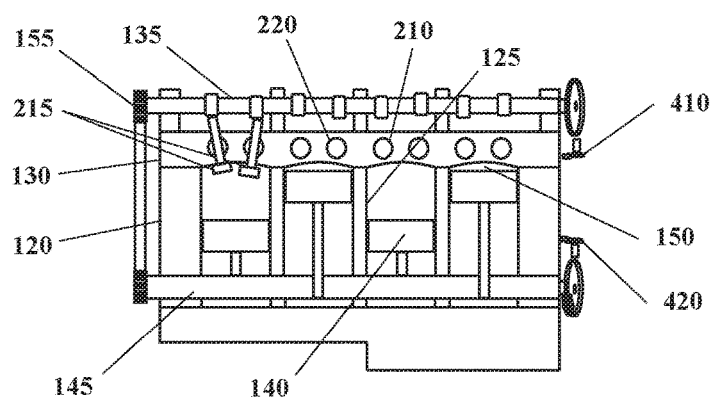
FIG. 2 is the section A-A of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an aftertreatment system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The aftertreatment system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon adsorbers, selective catalytic reduction (SCR) systems, and particulate filters, such as a Selective Catalytic Reduction on Filter (SCRF) 500. The SCRF 500 may be associated with a temperature sensor upstream of the SCRF 500 and temperature sensor downstream of the SCRF 560.

Other embodiments may include a high pressure exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300. Other embodiments may include also a low pressure exhaust gas recirculation (EGR) system 600 better explained hereinafter with reference to FIG. 3.

The automotive system 100 may further include an electronic control system (ECS) 450 in communication with a memory system 460, or data carrier, and an interface bus as well as in communication with one or more sensors and/or devices associated with the ICE 110. The ECS 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure sensors 430, an EGR temperature sensor 440, and an accelerator pedal position sensor 445. Furthermore, the ECS 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECS 450 and the various sensors and devices, but some are omitted for clarity.

Figure 5:
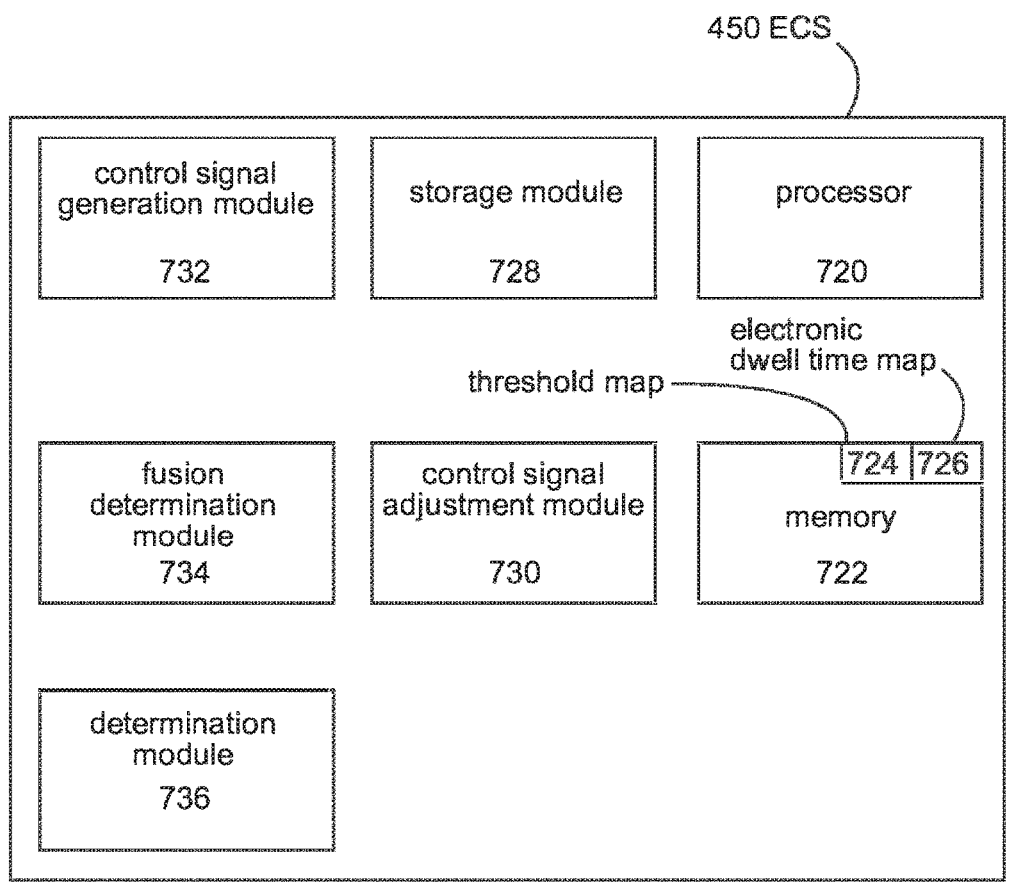
FIG. 5 illustrates exemplary modules of an electronic control system according to an embodiment of the present disclosure.

With reference now to FIG. 5, the ECS 450 may include a digital central processing unit (CPU) or processor 720 in communication with a memory 722, and an interface bus. The CPU 720 is configured to execute instructions stored as a program in the memory 722, and send and receive signals to/from the interface bus. The memory 722 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU 720 to carry out the steps of such methods and control the ICE 110.

The program stored in the memory 722 is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are, for example used when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium and readable to execute instructions in the computer program code. The storage medium can be of conventional type known in computer technology such as a flash memory, an Asic, a CD or the like.

Instead of an ECS 450 as shown in the FIGS. 1 and 5, the automotive system 100 may have a different type of processor to provide the electronic logic, e.g. an embedded controller, an onboard computer, or any processing module that might be deployed in the vehicle.

As used herein, the term module should be understood to encompass an application specific integrated circuit (ASIC), an electronic circuit, a processor 720 (shared, dedicated, or group) and memory 722 (see FIG. 5) that executes one or more software or firmware programs, a combinational logic circuit, and/or other suitable components that provide the described functionality. In particular, the modules described herein include at least one processor 720, a memory 722 and computer program instructions stored on the memory 722 for implementing the various functions and processes described with respect to the modules. Although separate modules are described herein, this does not exclude an integrated topology.

Figure 3E:
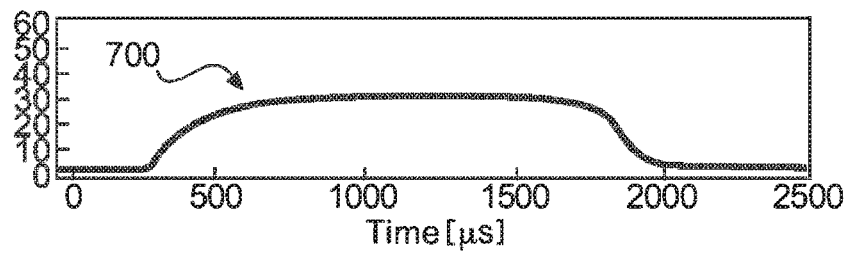
FIGS. 3A to 3 E illustrates exemplary hydraulic injection rates as a result of varying electric dwell times between control signals.
Figure 3D:
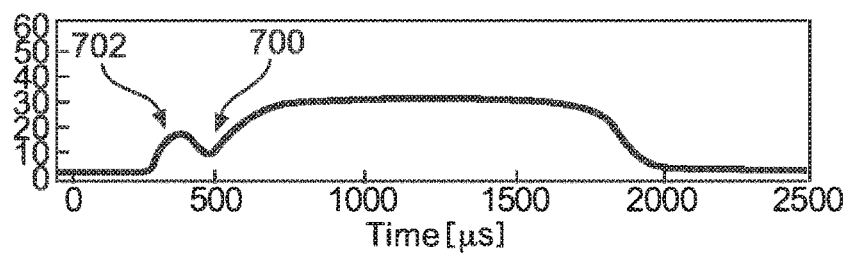
Figure 3C:
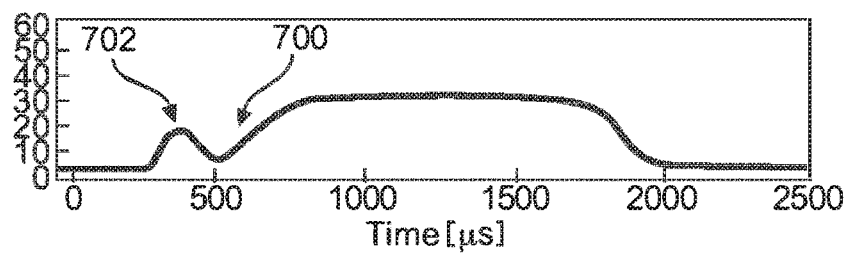
Figure 3B:
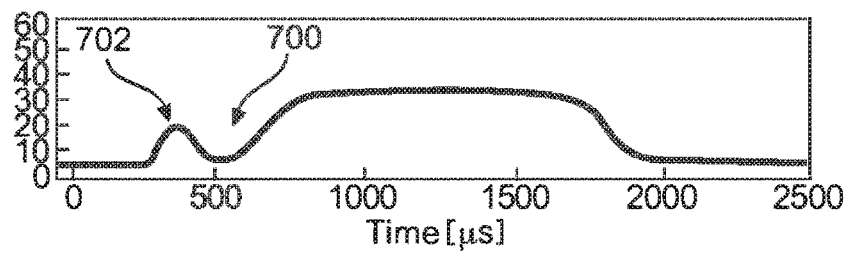
Figure 3A:
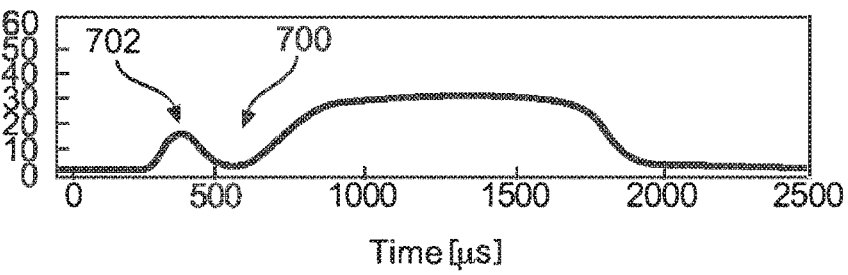

FIGS. 3(a) to 3(e) show exemplary injections executed by the injectors 160 during each cycle of the pistons 140 in respective cylinders 125 according to different, exemplary, injection schemes. FIGS. 3(a) to 3(d) show injection schemes with a decreasing hydraulic dwell time 700 between an end of a first injection 702 and a start of a second injection 704. The hydraulic dwell time decreases from about 300 microseconds in FIG. 3(a) to about 100 microseconds in FIG. 3(d). It has been found to be beneficial to minimize the hydraulic dwell time 700 in terms of fuel efficiency, combustion noise and/or soot emissions. In particular, a first injection 702 before a second injection 704 can enable better spray atomization and consequently combustion efficiency. However, due to ballistic needle movement of the injectors 160, it has been found to be desirable to avoid hydraulic fusion of the events (block injection) in order to ensure stable and low shot-to-shot deviation. An exemplary fused injection is shown in FIG. 3(e) by which the second injection has commenced before the end of the first injection such that there is no, or substantially no, hydraulic dwell time (e.g. 60 microseconds or less of hydraulic dwell time). In various embodiments, the first injection 702 is a pilot injection and the second injection 704 is a main injection. The first injection 702 has a smaller injection volume than the second injection 704.

Figure 4C:
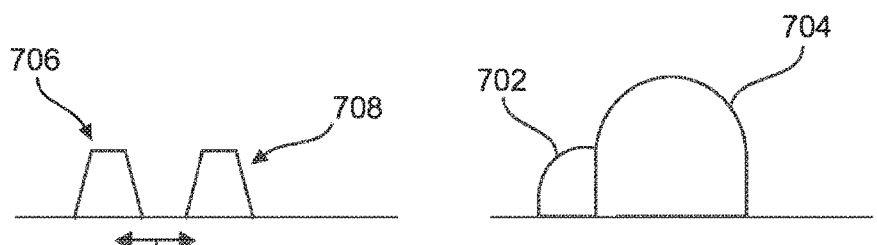
FIGS. 4 A to 4 C schematically illustrate electronic control signals and resulting hydraulic injections.
Figure 4B:
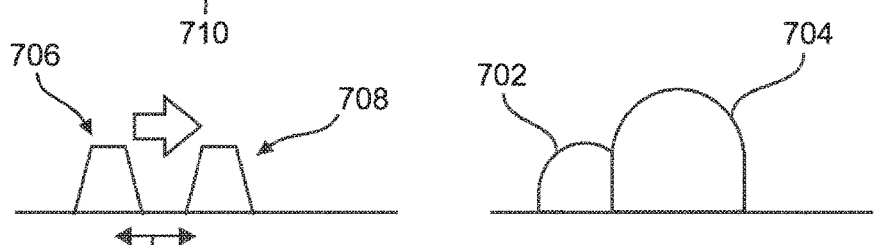
Figure 4A:
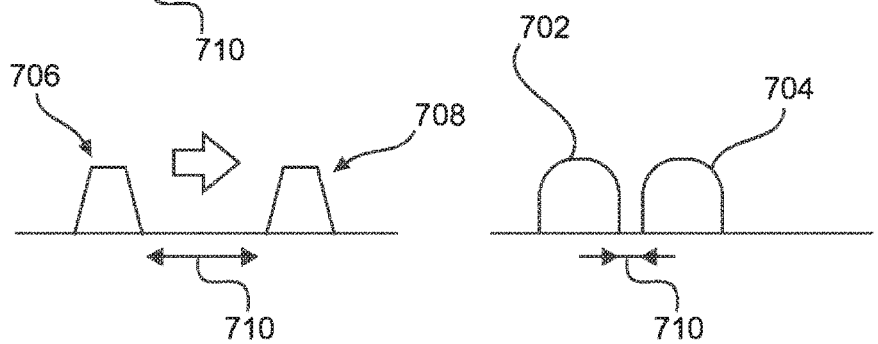

The injections 702, 704 of the injectors 160 are controlled by control signals 706, 708 that are schematically illustrated in FIGS. 4(a) to 4(c) in association with exemplary first and second injections 702, 704. In particular, first and second control signals 706, 708 are applied to the fuel injectors 160 by the ECS 450 in order to respectively generate first and second fuel injections 702, 704. There is an electric dwell time 710 between the first and second control signal 706, 708. FIGS. 4(b) and 4(c) show fused injections 702, 704 by which a second injection 704 commences before a first injection ceases 702. FIGS. 4(a) to 4(c) also illustrate that the first and second injections 702, 704 can be unfused or separated by increasing the electric dwell time 710 between an end of the first control signal 706 and a start of the second control signal 708. That is, the electronic control signals 706, 708 have an incrementally increasing electric dwell time 710 from FIG. 4(c) to FIG. (b) to FIG. 4(a), allowing the fused injections of FIG. 4(c) to be separated in FIG. 4(a).

Because of a tendency towards smaller hydraulic dwell times, it has been found that fusion of injections 702, 704 can occur, particularly due to ageing of one or more of the injectors 160. The present disclosure provides systems and methods, which are described further with respect to FIGS. 5 and 6, that detect when first and second injections 702, 704 are hydraulically fused as shown in the example of FIG. 3(e) and in the examples of FIGS. 4(b) and 4(c). The systems and methods of the present disclosure adjust an electric dwell time 710 between control signals 706, 708 to separate the first and second injections 702, 704 by increasing the electric dwell time 710 as shown in FIG. 4(c). Detection of injection fusion is carried out for each individual injector 160 and an electric dwell time correction is released for each injector 160 that has been determined to suffer from fused injections 702, 704.

Further, it has been found that quantity amplification events (up to 50% of the nominal injected quantity) can happen when fused first and second injections 702, 702 occur (e.g. when the first and second injections 702, 704 have a substantially zero hydraulic dwell time 700, e.g. of 60 microseconds or less). This finding allows fusion of injections 702, 704 to be determined by detecting fuel injection quantity.

Figure 6:
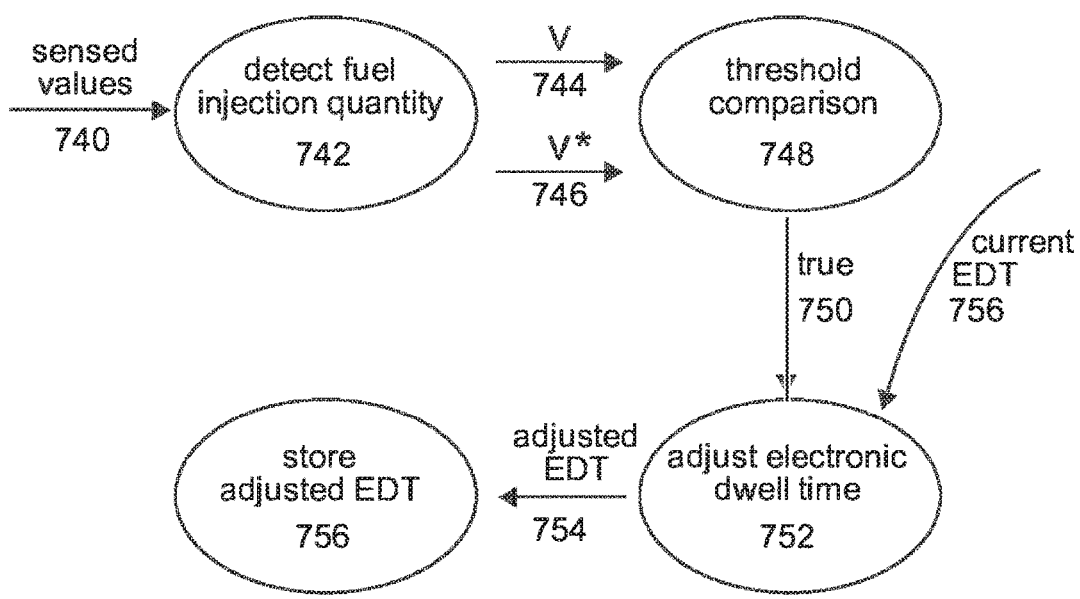
FIG. 6 is an exemplary data flow diagram illustrating methods according to an embodiment of the present disclosure.

FIG. 5 illustrates an ECS 450 according to an exemplary embodiment. The ECS 450 includes a processor 720, a memory 722, a detection module 736, a fusion determination module 734, a control signal adjustment module 730, a control signal generation module 732 and a storage module 728 that cooperate to implement the methods described herein, particularly as described with reference to FIG. 6. FIG. 6 illustrates an exemplary data flow diagram showing data processing methods by the ECS 450 and its modules for determining injection fusion and adjusting an electric dwell time 710 between first and second control signals 706, 708.

With reference to FIGS. 5 and 6, the fusion determination module 734 is configured to determine hydraulic fusion of the first and second fuel injections 702, 704 for each of the injectors 160 during a first cycle of the pistons 140 in the respective cylinders 125. In one exemplary embodiment, the fusion determination module 734 receives sensed values 740 representing fuel injection quantity from a detection module 734. The fusion determination module 734 is configured to detect fuel injection quantity 744 based on the sensed values 740. The fuel injection quantity 744 is a quantity of fuel injected by the injector 160 performing the first and second fuel injections 702, 704. The fusion determination module 734 is configured to receive a predetermined or threshold value 746 for the fuel injection quantity from a threshold map 724 stored in the memory 722. The fusion determination module 734 is configured to compare the threshold value 746 to the detected fuel injection quantity 744. If the comparison reveals that the detected fuel injection quantity 744 exceeds the threshold value 746, the fusion determination module 734 is configured to output a positive determination 750 that fusion of the injections 702, 704 has occurred.

The detection module 732 is configured to detect the fuel injection quantity 744 using known methods. For example, the detection module 732 may perform crank wheel acceleration frequency analysis, mass air flow and exhaust O2 concentration, in-cylinder pressure analysis, high frequency fuel system pressure analysis, etc. on the sensed values 740 in order to determine total fuel injection quantity 744 by fuel injections 702, 704 in the cylinder 125 during a crank or piston cycle.

The threshold map 724 includes empirically determined or model-based threshold values 746 for the fuel injection quantity 744. The threshold map 724 relates threshold values 746 and at least cylinder identification number and rail pressure. The detection module 732 retrieves the relevant threshold value 746 based at least one rail pressure and the cylinder identification number for the cylinder 125 in which an injector 160 under test is located. The threshold values 746 are defined to enable determination of injection fusion based on the finding that injection fusion tends to amplify fuel injection quantity substantially beyond a nominal fuel injection quantity when the injections 702, 704 are separated.

The control signal adjustment module 730 is configured to adjust at least one parameter of the first and second electronic control signals 710 in response to the positive determination 750 from the fusion determination module 734. In particular, electric dwell time 710 between the first and second electronic control signals 702, 704 is adjusted so as to separate the first and second injections 702, 704 in subsequent crank cycles. That is, the electric dwell time 710 is increased either in a predetermined increment or in an increment proportional to an extent by which the detected fuel quantity 744 exceeds the threshold value 746. The control signal adjustment module 730 retrieves a current electric dwell time 756 from an electric dwell time map stored in memory 722 and increments the current electric dwell time 756 to provide an adjusted electric dwell time 754.

The storage module 728 is configured to store the adjusted electric dwell time 754 in the memory 722 as an update to the electric dwell time map 726.

The ECS 450 may operate iteratively by applying test control signals to each injector 160 and at a plurality of rail pressures for each injector 160. The detection module 736 detects fuel injection quantity 744 for the test control signals and the determination module 734 determines injection fusion of the injector 160 under test and at the rail pressure of the injector 160 under test. Control signal adjustments are carried out by the control signal adjustment module 730 when any injector 160 is found to suffer from hydraulic fusion. In this way, the storage module 728 is able to store a map 726 of updated electric dwell times 754 at different rail pressures. Further, these adjusted electric dwell times can be extended to fuel injection quantities greater than the minimal fuel injection quantities generated because of the test control signals. Accordingly, the map of electric dwell times 726 relates cylinder identification number, rail pressures and target fuel injection quantities to electric dwell times.

The control signal generation module 732 is configured to generate control signals 706, 708 and apply the control signals 706, 708 to the injectors 160. The control signal generation module 732 generates the control signals 706, 708 using the electric dwell time map 726 stored in memory 722 which includes any adjusted electric dwell times 754. In particular, the control signal generation module 732 is configured to generate the control signals 706, 708 having an electric dwell time 726 according to the electric dwell time map 726 and being defined according to other properties stored in the electric dwell time map 726. The control signal generation module 732 uses rail pressure, target fuel injection quantity and cylinder identification number in order to determine the correct electric dwell time 710 for the injector 160. The control signals 706, 708 so generated are applied to the injectors in order to inject the target fuel quantity with separated or unfused injections 702, 704.

With continued reference to FIG. 5, and particularly to FIG. 6, methods according to exemplary embodiments of the present disclosure will be described. The methods disclosed herein allow the electric dwell time 710 to be determined to obtain hydraulic separation between injections 702, 704 after determining that an injector 160 suffers from hydraulic fusion of injections 702, 704.

As an initial step, threshold values 746 for fuel injection quantity are empirically or otherwise determined and stored in the threshold map 724. The threshold values 746 correspond to the maximum expected fuel injection quantity generated as a response to the test control signals in the absence of fusion of injections. The threshold values are determined for each injector 160 and at different rail pressures (e.g. 40 MPa, 80 MPa, 120 MPa and 160 MPa). The map of electric dwell times 726 is populated with initial values based on a model or empirically determined behavior of the injectors 160. The map of electric dwell times 726 relates rail pressure, target fuel injection quantity and cylinder identification number. The map of electric dwell times 726 is utilized by the control signal generation module 732 to set the electric dwell time 710 between control signals 706, 708 for application to the injectors 160 during operation of the internal combustion engine 110.

During a cutoff maneuver, a step 742 of detecting fuel injection quantity is performed for each injector 160 through the detection module 736. The detection step 742 is performed one injector 160, i.e. one cylinder 125, at a time. The detection step 742 is performed using a test injection pattern of plural injections 702, 704 defined to have minimal injection quantities for each injection 702, 704 and a minimal dwell time that does not cause injection fusion in the absence of ageing of the injector 160. The detection step 742 produces feedback of an injected fuel quantity 744 because of the injection pattern including plural injections 702, 704.

The injected fuel quantity 744 and threshold values 746 for the injected fuel quantity are compared by the fusion determination module 734 in a comparison step 748. The threshold values 746 are obtained from the threshold map 746. If the detected fuel injection quantity 744 is greater than the corresponding threshold value 746, a positive determination 750 can be made that fusion of injections 702, 704 has occurred. Consequently, a current electric dwell time 756 is increased in adjustment step 752 through the control signal adjustment module 730. As can be seen by comparing FIGS. 4(a) to 4(c), increasing the electric dwell time 710 is able to unfuse or separate hydraulic injections 702, 704. The detection, comparison and adjustment steps are repeated until the detected fuel injection quantity 744 is less than or equal to the corresponding threshold value 746.

Once the comparison step 750 determines that the detected fuel injection quantity 744 is less than or equal to the corresponding threshold value 746, iteration of the detection, comparison and adjustment steps 742, 748, 753 is stopped and the adjusted electric dwell time 754 is stored in a storing step 756 using the storage module 728. The stored adjusted electric dwell time 754 can be used for generating control signals in subsequent injections with separated or unfused injections assured. This adjusted electric dwell time 754 may be stored as an overwrite to an existing electric dwell time map or as a new learning map. Adjusted electric dwell times 754 are stored as a function of cylinder identification number, rail pressure level and an indicator of target injection quantity (e.g. injection volume or injector energization time). To do so, the detection, comparison and adjustment steps 742, 748 and 752 are performed for different rail pressures and for each cylinder 125.

The adjusted electric dwells times 754 as stored in the map 726 are released each time the dwell times 754 are needed for the respective injector 160 for operation of the internal combustion engine 110. Further, the adjusted electric dwell times 754 as stored in the map 726 are used as the current electric dwell times 756 used by the adjustment step 752 as a base for further adjustments.

The detection, comparison, adjustment and storage steps 742, 748, 752, 756 are performed with a test injection pattern having first and second injections 702, 704 having a minimum electric dwell time and target injection quantity defined by the electric dwell time map 724 for a given rail pressure. The electric dwell time map 724 may be initialized with values for injections 702, 704 having a very short hydraulic dwell time 700, but hydraulically separated pulses such as about 100 microseconds. The test injection pattern has control signals 706, 708 defining fuel injection quantities through the first and second injections 702, 704 that are as small as possible according to the electric dwell time map such as fuel injection volumes of 1 mm$^3$/stroke of the piston 140 for the pilot injection 702 and 1.5 mm3/stroke for the second injection 704).

The detection, comparison, adjustment and storage steps 742, 748, 752, 756 are repeated for each injector 160 in order to populate the electric dwell time map 726 with values ensuring separation of injections 702, 704.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes could be made in the function and arrangement of elements without departing from the scope of the disclosure as set forth in the appended claims and the legal equivalents thereof.

What is claimed is:

1. A method of controlling fuel injections by a fuel injector in a cylinder of an internal combustion engine, wherein at least first and second fuel injections are applied in each cycle of a piston in the cylinder, the method comprising:
   applying first and second control signals to the fuel injector during a first cycle of the piston to generate first and second fuel injections by the fuel injector into the cylinder;
   determining a hydraulic fusion state of the generated first and second fuel injections;
   adjusting an electric dwell time between the first control signal and the second control signal in response to the hydraulic fusion state; and
   applying the first and second control signals having the adjusted electric dwell time therebetween to the fuel injector to separate the first and second fuel injections during a second cycle of the piston which is subsequent to the first cycle.

2. The method of claim 1, further comprising sensing a value of at least one variable of hydraulic dwell time separating the first and second injections during the first cycle of the piston, and determining the hydraulic fusion state based on the value.

3. The method of claim 2, further comprising comparing the value to at least one predetermined value for the variable of hydraulic dwell time, and determining the hydraulic fusion state of the first and second injections based on the comparison.

4. The method of claim 3, wherein adjusting at least one parameter comprises adjusting the electric dwell time between the first and second control signals to correct a deviation of the value from the at least one predetermined value.

5. The method of claim 2, wherein the at least one variable of hydraulic dwell time comprises a quantity of fuel injection as a result of the first and second injections.

6. The method of claim 1, further comprising storing the adjusted electric dwell time between the first and second electronic control signals in memory.

7. The method of claim 1, wherein the method is for controlling fuel injections by a plurality of fuel injectors in respective cylinders of the internal combustion engine, the method comprising performing the applying steps, the determining step and the adjusting step for each cylinder.

8. The method of claim 1, comprising performing the adjusting step at a plurality of different rail pressures to obtain the at least one parameter of the first and second electronic control signals for each of the plurality of rail pressures when the hydraulic fusion state has been determined.

9. An electronic control system for an internal combustion engine having a cylinder with a piston and a fuel injector, wherein the electronic control system is configured to apply at least first and second electronic control signals to the fuel injector to generate first and second fuel injections during each cycle of the piston in the cylinder, the electronic control system comprising:
   a fusion determination module configured to determine a hydraulic fusion state of the first and second fuel injections during a first cycle of the piston; and
   a control signal adjustment module configured to adjust an electric dwell time between the first and second electronic control signals in response to the hydraulic fusion state;

wherein the adjusted electric dwell time between the first and second electronic control signals is configured for application to the fuel injector during a subsequent cycle of the piston to separate the first and second fuel injections.

10. The electronic control system of claim 9, further comprising a sensor configured to obtain a value of at least one variable of hydraulic dwell time separating the first and second injections and a detection module configured to receive the value from the sensor and determine the hydraulic fusion state based on the value.

11. The electronic control system of claim 10, wherein the fusion determination module is configured to compare the value to a predetermined value for the variable of hydraulic dwell time and to determine the hydraulic fusion state of the first and second injections based on the comparison.

12. The electronic control system of claim 11, wherein the control signal adjustment module is configured to adjust the at least one parameter of the first and second control signals to correct a deviation of the value from the predetermined value.

13. The electronic control system of claim 10, wherein the at least one variable of hydraulic dwell time comprises a quantity of fuel injection as a result of the first and second injections.

14. The electronic control system of claim 9, further comprising a storage module having memory configured to store the adjusted electric dwell time between the first and second electronic control signals therein.

15. The electronic control system of claim 9, wherein the control signal adjustment module is configured to adjust the electric dwell time between at least first and second electronic control signals for each of a plurality of injectors of the internal combustion engine at a plurality of different rail pressures.

16. The electronic control system of claim 9, wherein the electronic control system is configured to iterate running the fusion determination module and the control signal adjustment module in order to populate a map relating rail pressure, cylinder identification number, an indicator of fuel injection quantity and the at least one parameter of the first and second control signals.

17. A vehicle, comprising:
an internal combustion engine having a cylinder, a piston operable to cycle in the cylinder and a fuel injector for injecting fuel into the cylinder during a piston cycle; and
an electronic control system configured to:
apply at least first and second electronic control signals to the fuel injector for generating first and second fuel injections during each piston cycle;
determine a hydraulic fusion state of the first and second fuel injections during a first cycle of the piston; and
adjust an electric dwell time between the first and second electronic control signals in response to the hydraulic fusion state;
wherein the adjusted electric dwell time between the first and second electronic control signals is configured for application to the fuel injector during a second cycle of the piston subsequent to the first cycle to separate the first and second fuel injections.

18. The vehicle of claim 17, further comprising a sensor configured to sense a fuel volume injected into the cylinder, wherein the electronic control system is further configured to compare the fuel volume to at least one predetermined value therefor and determine the hydraulic fusion state based on the fuel volume exceeding the at least one predetermined value.

* * * * *